Nov. 1, 1960 — G. H. FUEHRER — 2,958,534
WORKING TOOL RETAINER MECHANISM
Filed Nov. 2, 1959 — 2 Sheets-Sheet 1
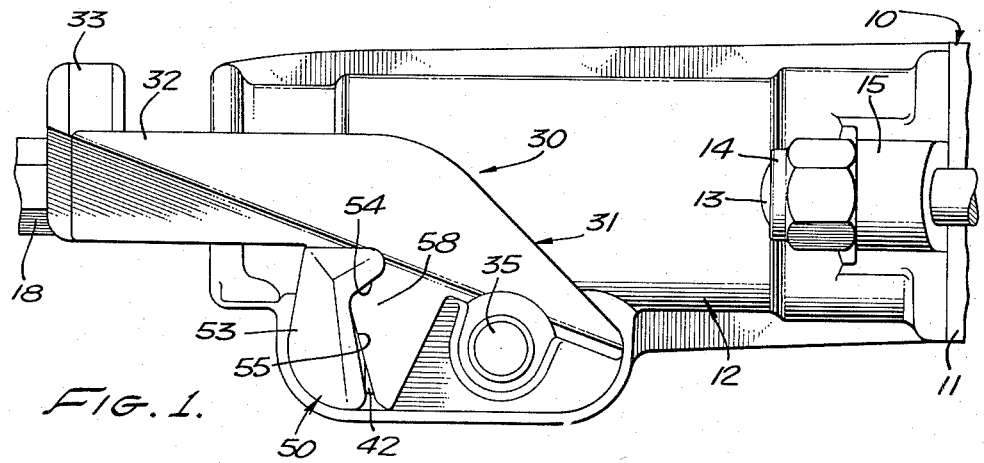
FIG. 1.
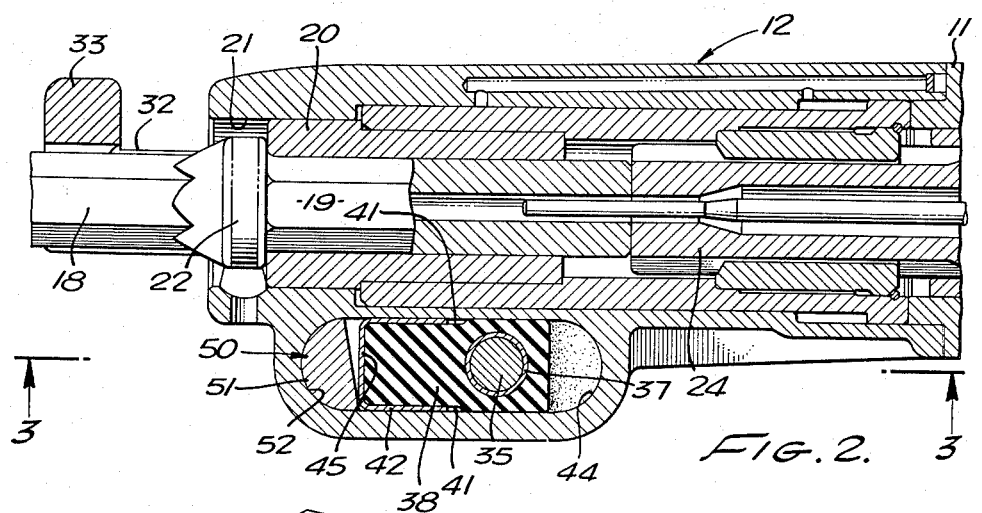
FIG. 2.
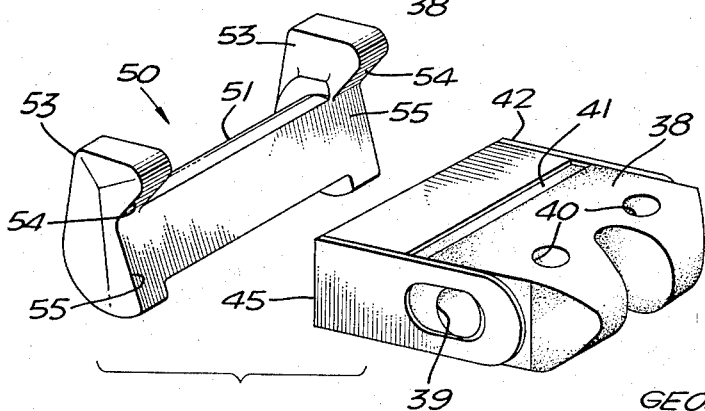
FIG. 6.
INVENTOR.
GEORGE H. FUEHRER
BY
ATTORNEY Nov. 1, 1960   G. H. FUEHRER   2,958,534
WORKING TOOL RETAINER MECHANISM
Filed Nov. 2, 1959   2 Sheets-Sheet 2

INVENTOR.
GEORGE H. FUEHRER
BY
ATTORNEY

United States Patent Office 2,958,534
Patented Nov. 1, 1960

2,958,534

WORKING TOOL RETAINER MECHANISM

George H. Fuehrer, Downey, Calif., assignor to Thor Power Tool Company, Aurora, Ill., a corporation of Delaware Filed Nov. 2, 1959, Ser. No. 850,203

8 Claims. (Cl. 279—19.1)

This invention relates to pneumatically actuated power tools and more particularly to an improved, simple, rugged, highly reliable, positively-locking retainer mechanism for holding a drill steel or other tool positively assembled to its front head.

Pneumatically actuated power tools commonly employ a coupling device associated with their front head unit which coupling is operable to detachably hold a drill steel assembled thereto. As is well known, such tools employ rapidly repeated short impact blows delivered to the inner end of the working tool. The working tool must be free to move through a short reciprocable distance relative to the impact-imparting power source while being held assembled to the power unit. To this end the working tool is normally provided with a collar spaced inwardly from its rear end which collar serves to limit the reciprocal movement. This collar also cooperates with a retainer yoke carried by the power unit and embracing the working tool at a point forwardly of the collar in such manner as not to interfere with the reciprocation of the drill steel but in the path of movement of the collar.

The retainer yoke is usually pivoted to one side of the tool front head and requires some means for holding it normally in its closed tool-retaining position yet permitting the retainer yoke to be opened to release the tool. As is well known, such retainer mechanisms operate under very severe and rigorous conditions. Not only are all parts of the assembly subjected to severe vibration and impact blows, but the assembly tool and all its accessories receive the roughest handling treatment and operate under severe dirt, dust and moisture conditions. A satisfactory retainer mechanism should not require the use of wrenches or other tools for its manipulation yet should be highly resistant to accidental or unintended opening under normally encountered operating conditions.

Retainer mechanisms meeting these numerous requirements have been proposed in considerable number but all are subject to shortcomings and defects sought to be obviated by the present invention. For example, certain of these devices have proposed the use of various arrangements of spring detent devices for holding a detent seated in a well or the like and operable to prevent unintended opening of the retainer yoke. However, such devices are easily rendered non-functional by the collection of debris, dirt and the like in the spring or in the well seating the detent. Other arrangements proposed in an effort to avoid these shortcomings have included the use of tubes, blocks and other configurations of rubber materials in combination with cammed detents. These may perform satisfactorily for a time but are likely to become non-functional due to the cold flow tendencies of rubber and the fact that the rubber is required to be maintained under stress whenever the retainer is in its normal or closed condition. Retention of the retainer in this condition results in the rubber taking a set and becoming partially or totally ineffective for its intended purpose.

With the foregoing and other defects and shortcomings of prior art constructions in mind, it is the purpose of the present invention to provide a simplified and more reliable retainer mechanism employing a large block of resilient oil resistant elastomer so arranged that it is placed under stress only briefly during the opening and closing of the retainer yoke. At other times the resilient material is substantially unloaded and therefore not subject to cold flow or other forms of deterioration accompanying long-duration constant loading.

More specifically, the present mechanism includes a generally typical container yoke the hinge pin of which is journaled in a large block of elastomer having a close sliding fit in an elongated slot formed transversely of the power unit front head. A rockably supported retainer detent is movably mounted between one end of this opening and the adjacent end of the resilient block and co-operates with a pair of lugs on the legs of the retainer yoke to compress the resilient block as the yoke moves into and out of locking position, this movement serving to rock the retainer detent about its socket in opposition to the resiliency of the elastomeric block. Once the parts are pivoted into their locked position, substantially the entire compressive load is removed from the elastomer with the result that there is no appreciable distortion of the block and no inducement for cold flow thereof. Any force tending to rotate the retainer yoke out of locked position immediately compresses the resilient block and this compressive force is used in a highly effective and positive manner to thwart opening of this yoke except by the manual application of the predetermined design opening force.

Accordingly, it is a primary object of the present invention to provide an improved, more reliable, positively-locking working tool retainer mechanism.

Another object of the invention is the provision of a pneumatic power tool retainer mechanism coupling having a minimum number of simple, rugged parts cooperable to lock the retainer positively closed as well as one which may be quickly opened without need for tools or special manipulating devices.

Another object of the invention is the provision of a working tool retainer mechanism operable to be held positively locked by the resilience of a large block of elastomeric material arranged to be placed under substantial stress only briefly during the opening and closing movement of the mechanism whereby the same is not subject to cold flow during the protracted periods in which tools are normally left assembled to the power unit.

Another object of the invention is the provision of a retainer mechanism wherein the retainer yoke is provided with lugs which mate with a rockably supported detent retainer arranged to pivot oppositely to the direction of movement of the yoke during its opening movement.

Another object of the invention is the provision of a retainer mechanism in which a single fastener suffices to hold all components of the mechanism assembled to the power unit.

These and other more specific objects will appear upon reading the following specification and claims and upon considering in connection therewith the attached drawings to which they relate.

Referring now to the drawings in which a preferred embodiment of the invention is illustrated:

Figure 1 is a fragmentary side elevational view of a conventional pneumatic tool incorporating the retainer mechanism of the present invention, the parts being shown in the closed or locked position of the retainer;

Figure 2 is a longitudinal sectional view taken on Figure 1 in the plane of the drawing;

Figure 6 is an exploded view in perspective of the retainer detent and of the resilient block.

Figure 3:
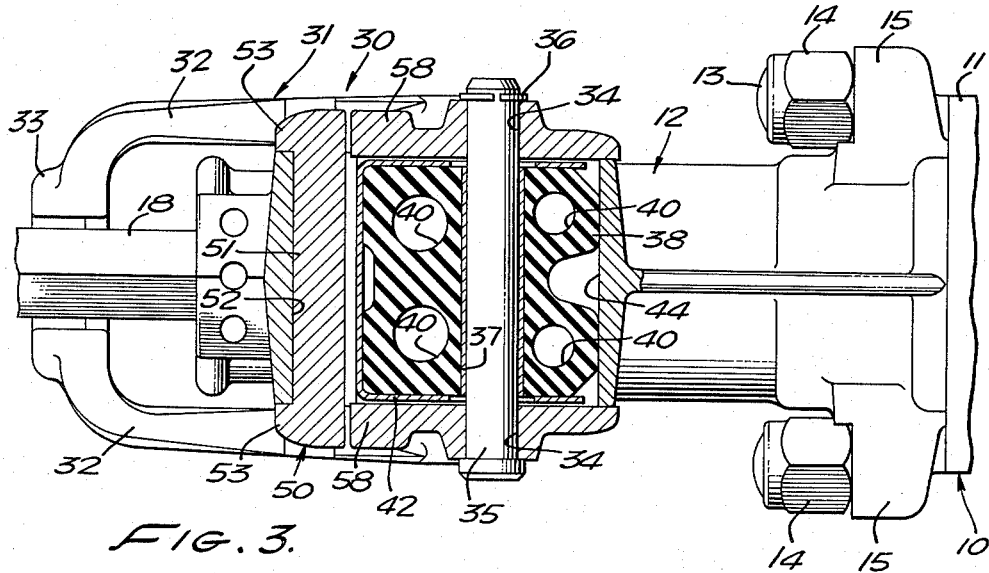
Figure 3 is a fragmentary cross-sectional view through the retainer mounting slot and taken along line 3—3 on Figure 2.

Referring to the drawings and more particularly to Figures 1 and 2, there is shown the front head end only of a typical pneumatic power unit, designated generally 10, of the type commonly used in pavement breaker work and in drilling holes in concrete, rock and other like hard formations. Since the construction and operation of such power units is well known to those skilled in this art, detailed showing and descriptive material of the structure is deemed unnecessary. It will be understood that the main body or cylinder 11 of the power unit is secured to the front head casting 12 by a pair of studs 13 and shakeproof retainer nuts 14 bearing against lugs 15 integral with the rear end of front head 12.

The drill steel or other working tool 18 has a hexagonal or other non-circular shank end 19 having a loose sliding fit within a journal sleeve 20 suitably mounted in an axial bore 21 passing through front head 12. As is best shown in Figure 2, drill steel 18 is provided with an annular flange or collar 22 spaced from the rearmost end of shank 19 and cooperating with the end of journal sleeve 20 to limit inward socketing movement of the drill steel. As is well known to those skilled in this art, collar 22 is free to move axially through a predetermined distance to deliver cutting blows to the material being worked, power for this cutting movement being delivered by the reciprocation of hammer piston 24 operating to and fro within cylinder 11 in known manner.

Retainer mechanism, designated generally 30 and constituting the essence of the present invention, includes a generally U-shaped retainer yoke 31 comprising a pair of identical legs 32 joined at one end by a bight portion 33 of arcuate configuration to straddle drill steel 18 in the manner well known to those skilled in this art. The outer or free ends of legs 32 are provided with a pair of aligned openings 34 for receiving a hinge pin 35 held in assembled position by a suitable keeper such as the split spring ring 36. Hinge pin 35 is loosely journaled in a sleeve of suitable bearing material 37 which may be embedded in a block of resilient oil-resistant elastomeric material 38. Desirably, material 38 is of neoprene due to its particularly desirable characteristics for this rugged service. However, it is to be understood that other oil resistant elastomers may be employed if desired.

Resilient block 38 is best illustrated in Figure 6 wherein it will be seen to have a generally rectangular shape and a transverse bore 39 seating sleeve 37. Other openings 40 distributed about the block add to its resiliency and provide space for the rubber to deform under the operating loads to which it is subjected in use. One end of block 38 is suitably relieved, as indicated at 41, to receive a combined wear and bearing housing formed from sheet brass or the like and suitably cut and bent to enclose the opposite lateral ends, the bottom and the adjacent sides of block 38 in the manner illustrated in Figures 2 and 6.

Block 38 and its bearing housing 42 are slidably supported in an elongated opening 44 of elliptical shape formed across front head 12 in the manner made clear by Figures 2 and 3. It is to be noted in particular that bottom 45 of housing 42 terminates short of one end of elliptical opening 44 for a purpose which will be explained presently.

Figure 4:
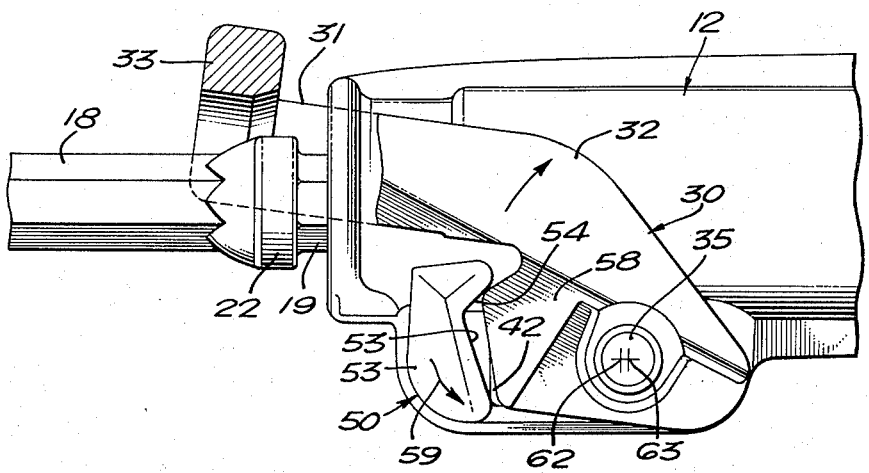
Figure 4 is a fragmentary view similar to Figure 1 but showing the position of the parts as the retainer yoke approaches locking engagement with the retainer detent, the resilient block being under very considerable stress in this transient position of the components.

The final and highly important component of the retainer mechanism is the retainer detent designated 50 shown in perspective in Figure 6. The retainer detent 50 has a semi-circular main body 51 conforming to the complementally-shaped end 52 of opening 44 and includes flanges 53 at either end designed to lie closely adjacent the opposite ends of opening 44 and to cooperate therewith in holding the detent in its assembled position. As is best shown in Figures 1 and 4, flanges 53 of the retainer have identical V-notches formed by converging surfaces 54 and 55.

Figure 5:
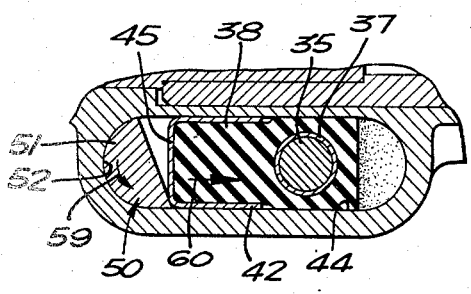
Figure 5 is a fragmentary cross-sectional view through a portion of the retainer mechanism and is generally similar to the showing in Figure 2 except that the parts occupy positions corresponding to the position of the retainer yoke shown in Figure 4.

Cooperating with the V-notch formed by converging surfaces 54 and 55 are a pair of generally complementally shaped locking lugs 58 integral one with each leg 32 of retainer yoke 30. The locked position of the parts is that shown in Figure 1 and it is pointed out and emphasized that the parts are so proportioned and designed that, desirably, resilient block 38 is under little or no compressive force when locking lugs 58 are properly seated in the retaining V-groove formed by converging surfaces 54, 55 of retainer detent 50. Under these conditions, the pointed ends of lugs 58 are seated directly within the convergence of surfaces 54 and 55 and the adjacent outer corner of bearing housing 42 for block 38. The retainer mechanism is then fully closed and surface 55 of detent 50 is in light pressure contact with the juxtaposed corner of block 38, as is best shown in Figure 1. However, any force tending to rotate retainer yoke 30 clockwise about hinge pin 35 will cause lug 58 to contact serface 54 and tend to rotate retainer 50 clockwise about its own axis, as is indicated by arrow 59 in Figure 5. In consequence, block 38 is pressed toward the right hand end of opening 44 as viewed in the drawings thereby placing this block under compression as is indicated by arrow 60 in Figure 5. It will be understood that the slightest clockwise movement of retainer yoke 30 about hinge pin 35 from its fully locked position also applies compressive forces to the portion of block 38 adjacent the right end of opening 44, the value of such compressive forces increasing rapidly as clockwise movement of the yoke continues in opposition to retainer detent 50 and until the yoke reaches approximately the position shown in Figure 4. At this point the compression of block 38 has reached a maximum value and further rotary clockwise movement completely releases the yoke and the compressive forces on block 38 and allows the yoke 30 to pivot freely.

Not only does the counterclockwise rotary movement of retainer 50 as viewed in the drawings act to compress block 38 but the obstruction to lugs 58 provided as these lugs contact surface 54 acts through hinge pin 35 to move the entire yoke assembly and block 38 against the right hand end of opening 44 as viewed in the drawings. The extent of this movement is indicated by the distance between the normal position of the axis of pin 35 indicated at 62 (Figure 4) and its position at 63 during maximum stressing of block 38. Accordingly, it will be recognized that all portions of block 38 are placed under compression during opening and closing of yoke 30 and that the movement includes both bodily and pivotal movement.

Once the pointed ends of lugs 58 have passed beyond surfaces 54, the yoke pivots freely. Once yoke 30 is open, drill steel 18 may be withdrawn and replaced by another drill steel or with some other working tool. When the replacement is in place, it is locked securely there simply by the operator pressing against bight portion 33 of the yoke and rotating it counterclockwise about hinge pin 35. As the yoke approaches the position shown in Figure 4, the pointed ends of lugs 58 engage the rounded ends of surfaces 54 and rotates the retainer counterclockwise to place block 38 under compression against the right-hand end of opening 44. As lugs 58 seat in the apex formed by converging surfaces 54 and 55 of retainer detent 50, the compressive forces acting on block 38 during the closing movement are substantially fully relieved.

It will be recognized that, if found desirable to meet particular operating conditions, the parts may be so designed as to maintain block 38 under appreciable preload at all times.

The operator may now proceed to use the tool to break pavement or to drill holes in the usual manner. There is no possibility of the drill steel being accidentally or unintentionally released from its assembled position and it is free for limited reciprocable movement as permitted by the spacing of bight portion 33 of the retainer yoke from collar 22 on the shank of the drill steel.

While the particular drill steel retainer mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A working tool retainer mechanism for a pneumatically operated power unit of the type having a front head for loosely and reciprocably supporting a working tool held detachably coupled thereto by a quick release retainer mechanism, said front head having an elongated slot extending crosswise and along one side thereof, a retainer yoke pivotally supported by means including a block of resilient elastomeric material having a sliding fit within said slot, and cooperating lug and detent means carried by said yoke and said front head respectively operable to lock said yoke positively in closed position to hold a working tool assembled to said front head, said detent means being resiliently held in locking position by said block of resilient material, said detent means being movably supported transversely of said slot with one surface positioned to contact said block of resilient material under pressure to resist movement of said yoke lug into and out of locked position.

2. Working tool retainer mechanism as defined in claim 1 characterized in that said detent means comprises a rocker member extending crosswise of said slot at one end thereof with one edge thereof positioned to bear against the adjacent end of said resilient block, said detent means being rockable to-and-fro through a short arc in opposition to the resiliency of said resilient block as said retainer yoke approaches and departs from its closed position to lock a working tool in assembled position.

3. Working tool retainer mechanism as defined in claim 2 characterized in that said rocker member includes flanges at its ends adapted to extend along the opposite end faces of said slot and being cooperable with said end faces and with said resilient block to hold said rocker member in assembled position in said slot.

4. Working tool retainer mechanism as defined in claim 2 characterized in that said resilient block includes a combined wear and bearing member enclosing at least the end portion thereof adjacent said rocker member.

5. Retainer mechanism for holding a working tool positively locked assembled to the front head of a pneumatic power unit, said mechanism including a movably supported block of resilient material and a generally U-shaped retainer yoke the end portions of the legs of which are journaled crosswise of the power unit front head by a hinge pin mounted in said block of resilient material, and cooperating retainer detent means and lug means for releasably locking said yoke in closed position to lock a working tool assembled to a socket therefor formed axially within said front head, said yoke and said retainer detent means interengaging one another and being pivotal in opposite directions about spaced parallel axes as said yoke moves into and out of locked position.

6. Retainer mechanism as defined in claim 5 characterized in that the legs of said U-shaped yoke straddle said front head with their adjacent sides in close proximity to the opposite sides of said front head, said front head having an elongated opening transversely thereof, a block of resilient oil resistant elastomer seated in said opening, and retainer hinge pin means extending lengthwise of said opening and through said block and the legs of said yoke, retainer detent means socketed between one transverse end of said block and an end wall of said opening and having retainer lug means thereon cooperable with lug means on the legs of said yoke to compress said block of elastomer as said yoke lug means rock said socketed detent means within said opening thereby to permit said retainer yoke to pivot into and out of the closed position thereof wherein a drill steel is positively locked coupled to said front head.

7. Retainer mechanism as defined in claim 5 characterized in that the components thereof including said block of resilient material are so proportioned that in the closed and locked position of said components said resilient block is under only sufficient stress as to prevent looseness and lost motion between the components of said mechanism.

8. Retainer mechanism as defined in claim 5 characterized in that the components thereof are so proportioned that said block of resilient material is placed under high compressive load as said yoke is moved into and out of closed position and that said block is substantially free of compressive load in the closed position of said retainer yoke.

References Cited in the file of this patent

UNITED STATES PATENTS

| | | |
|---|---|---|
| 1,646,773 | Slater | Oct. 25, 1927 |
| 1,729,668 | Slater | Oct. 1, 1929 |
| 1,807,799 | Slater | June 2, 1931 |
| 1,962,790 | Slater | June 12, 1934 |
| 2,720,401 | Fuehrer | Oct. 11, 1955 |